Inventor
FRANK BERNAD HARLEY
By
Emery, Holcombe & Blair
Attorney

United States Patent Office 2,722,449
Patented Nov. 1, 1955

2,722,449

RELEASABLE FASTENINGS FOR COUPLING OR LATCHING TOGETHER TWO RELATIVELY MOVABLE MEMBERS

Frank Bernard Harley, Egham, England

Application November 6, 1951, Serial No. 255,114

Claims priority, application Great Britain November 6, 1950

7 Claims. (Cl. 294—83)

This invention relates to releasable fastenings of the type comprising a body portion for releasably retaining a subsidiary portion including a bar, the parts to be releasably fastened together being secured respectively to the body portion and the subsidiary portion. The term bar is used herein to include any similar rod-like member or pin, in particular a part of a ring. The invention is applicable to fastenings for connecting the end of a belt, cord or the like to its other end or to the end of another belt or the like, or to a fixed anchorage, or to latches for connecting two rigid parts, for example gate or door or window latches.

The main object of the invention is to provide an improved fastening or coupling of this type which, whilst being economical to manufacture and simple in operation, will not only be foolproof both for engagement and release, but will combine positive locking when in engagement and even under excessive load, with ready and immediate release under all conditions.

According to the present invention the body portion includes a body affording an open ended notch to receive the bar, a forked retaining catch pivotally carried by the body and movable between a released position, in which one limb of it projects into the notch, and a locked position, to which it can be turned by the bar entering the notch and in which its other limb bridges the open end of the notch to prevent withdrawal of the bar, and a locking detent serving automatically to lock the retaining catch in the locked position when moved thereto.

The detent may be constituted by a latch member mounted to pivot on the body portion, and preferably the surface of the detent engaging the catch extends in the direction of the length of an arc concentric with the pivot axis of the detent.

In a convenient form of the invention the catch and detent are constituted by two plate-like members mounted on spaced pivots and lying in substantially the same plane. The body may be constituted by two parallel plate-like members spaced apart and carrying the catch and detent between them.

The catch is preferably spring biassed towards its open position so that, when the detent is tripped, the catch is opened with a rapid snap-like movement. The detent is also preferably spring biassed towards engagement with the catch. For example, opposite ends of a single biassing spring may act respectively on the catch and detent. With such an arrangement the movement of the detent to release the catch increases the spring force urging the catch towards its open position.

The invention may be carried into practice in various ways but certain specific embodiments will be described by way of example with reference to the accompanying drawings, in which.

The invention may be employed for a wide variety of purposes, for example for fastening together two straps or two ends of the same strap or for fastening a strap to an anchorage or for latching together two rigid parts as in a gate latch or door latch.

Figure 1:
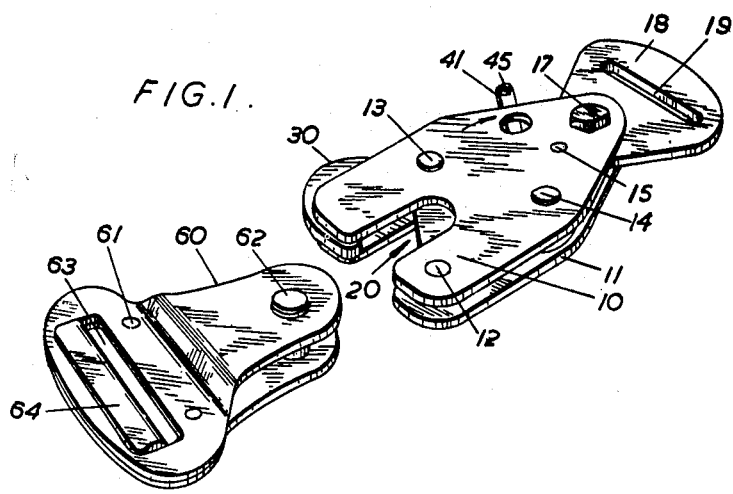
Figure 1 is a perspective view of one form of fastening device.

The construction shown in Figure 1 is intended for use in connecting together two webbing straps, for example the two ends of a safety belt for aircraft passengers. The main body of the fastening is formed from a pair of plate metal stampings 10 and 11 which are held together in parallel spaced relationship by four rivets 12, 13, 14 and 15. In each case the rivet is provided with a sleeve or formed with shoulders so as to hold the plates apart by the desired spacing, which may for example be about ⅛".
At one end, which may be referred to as the rear end, the plates are provided with aligned holes 16 to receive a bolt 17 which passes through them and also through a hole in a triangular plate 18 having in it a slot 19 to receive one of the straps which is permanently secured to it as by stitching.

Figure 2:
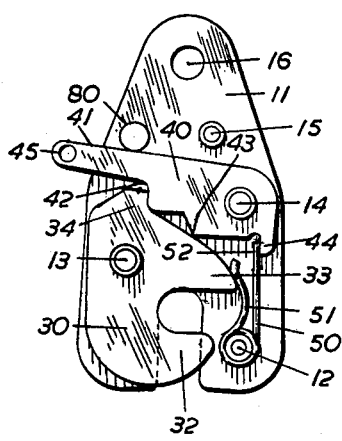
Figure 2 is a view of the body portion of the fastening device, with the top plate removed, in the closed position.
Figure 3:
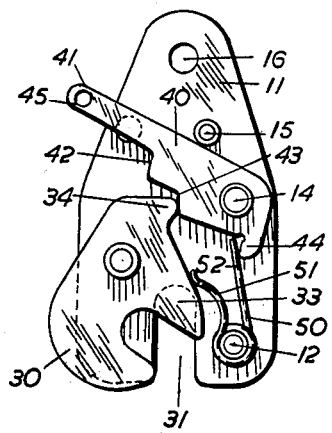
Figure 3 is a view similar to Figure 2 showing the parts in the open position.

The forward ends of the two plates 10 and 11 are formed with open-ended notches 20 which are in line with one another and together constitute a gate lying on the longitudinal axis of the body portion. A catch 30, also in the form of a plate metal stamping, is arranged between the body plates 10 and 11 and pivoted on the rivet 13, which as shown in Figures 2 and 3 lies to one side of and slightly to the rear of the open-ended notches 20. The catch 30 has a forked head forming an open-ended notch 31 one side of which is bounded by a hook-like bill or forward limb 32 whilst the other side is bounded by a rearward limb 33 having a curved outer edge. On the side of the pivot remote from the forward limb 32 the catch is provided with a tail 34 which cooperates with a detent in the form of a latch lever 40 also lying between the two body plates in the same plane as the catch 30.

The latch lever 40 is pivoted on the rivet 14, which as shown in Figures 2 and 3 is on the opposite side of the longitudinal centre line from the rivet 13. The free end 41 of the latch lever projects from between the two body plates and forms a finger piece for releasing the catch whilst one edge of the latch lever is formed with two steps, a major step 42 remote from the pivot 14 and a subsidiary step 43 nearer to the pivot. The surface of the major step extends tangentially to, or along, an arc concentric with the axis of the pivot 14 of the latch lever.

A wire spring 50 is coiled round the rivet 14 and has one end 51 bearing against the rear limb 33 of the catch whilst the other end 52 bears against a tail 44 formed on the rear end of the latch lever, so that the spring urges the latch lever in a counter-clockwise direction and the catch in a clockwise direction as viewed in Figures 2 and 3.

The subsidiary portion 60 of the fastening is formed of two plate metal stampings which at one end are pressed together and held together by rivets 61 whilst at the other or front end they are spaced apart so as to lie parallel to one another, and carry a bar 62 extending between them and of suitable size to enter the gate formed by the open-ended notches 20 in the body plates. At their rear ends the plates are formed with a slot 63 and the material of the slot in one plate may afford a lug which is bent through the slot in the other plate and back so as to give a smooth curve to the rear edge of the slot. The length and width of this slot will correspond to the width and thickness of the webbing strap which is secured permanently to it as by stitching.

When the two portions of the fastening are out of engagement, the coil spring holds the catch in its open position shown in Figure 3, that is to say with the forward limb 32 lying clear of, and the rearward limb inclined across, the gate 20 in the body portion. At the same time, the biassing spring 50 urges the detent or latch lever towards the catch whose tail engages the subsidiary step in the detent whereby the opening movement of the catch is limited. If now the two portions of the fastening are to be engaged, the bar of the subsidiary portion is inserted into the open gate of the body portion and pressed inwards against the inclined edge of the rearward limb of the catch. The catch is thus turned about its pivot against the action of the spring and the tail on the catch rides up the surface extending from the subsidiary step to the major step on the detent. The major step or abutment of the detent now snaps under the tail of the catch which is thereby positively held against opening movement about its pivot. With the catch in this position, shown in Figure 2, its two limbs straddle the bar of the subsidiary portion of the fastening and extend transversely across the gate so that the bar is locked in the gate.

It will be apparent that the tensile load which can now be applied through the two parts of the fastening is considerable since the catch cannot rotate towards its open position by reason of the positive locking effect of the detent. Even under extremely heavy tensile loads, however, the catch can be readily and substantially instantaneously released by merely applying a finger to the end of the detent projecting from the body portion and turning the detent through a small angle about its pivot. Since the major step or abutment on the detent now engaged by the tail of the catch extends tangentially to, or along, an arc concentric with the detent pivot, this release movement of the detent will not materially, if at all, turn the catch about its pivot so that the force required to release the detent is not greatly affected by the turning force applied to the catch by the tensile load.

When the nose of the catch slips off the major step or abutment on the detent, the spring acting on the curved outer edge of the rearward limb turns the catch with a rapid or snap-like movement into its open position, the tail of the catch riding down the cam on the detent until the said tail engages the subsidiary step in the detent. This snap-like opening movement of the catch tends to eject the bar of the subsidiary portion of the fastening out through the open end of the gate so that if the load on the fastening at the time of release happens to be too low to withdraw the bar from the gate, the bar is firmly ejected by the opening movement of the catch. In this respect it should be noted that the release movement of the detent increases the force of the spring acting on the catch and tending to move it to its open position to eject the bar.

Figure 4:
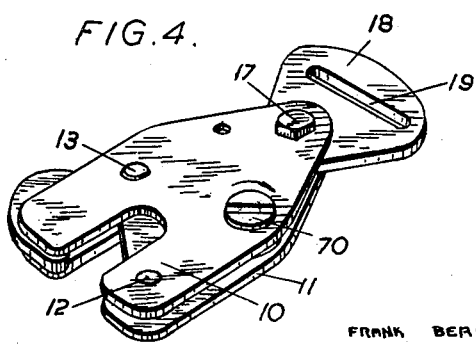
Figure 4 is a perspective view of the body portion of a slightly modified form of fastening device.

In some circumstances it may be desirable to reduce or obviate risk of unintentional tripping of the detent. To this end, as shown in Figure 4, the latch lever may be shortened so as not to have an end 41 projecting from the body plates as shown in Figures 1 to 3. In the construction of Figure 4 the latch lever has in it a square aperture, not shown, through which extends a similarly shaped part of a release stud 70 journalled in the two walls of the body portion, the stud having an operating head either flush with or only extending slightly above the surface of one wall. The head of the release stud may be knurled or it may be provided as shown with a slot or groove which can be engaged by a screwdriver or coin to trip the detent.

In some instances it may be desirable to provide means for locking the detent itself against unauthorized release and to this end apertures 80 may be provided in the body portion so that when the catch is in the closed position these apertures can receive a releasable lock such for example as a spigot or the hasp of a padlock, to prevent release movement of the detent.

Again in other cases it may be desirable to attach a cord or the like to the detent which may be provided with a hole 45 for the purpose. This enables a number of fastenings to be ganged for simultaneous release, for example for jettisoning purposes.

Instead of providing the rear ends of the body plates with holes to receive the bolt 17 these may be formed in a manner analogous to that of the subsidiary portion 60 to receive the strap directly. That is to say the plates may have square ends which are bent so as to lie in contact with one another and are formed with slots to receive the strap. The arrangement shown has, however, the advantage that the triangular plate 18 may be replaced either by other similar plates to receive straps of different sizes or by other types of fitting for securing the body to various different forms of part whether fixed or movable. It will be appreciated that when the coupling is to be used between a fixed part and a movable part, the two body plates may be bent outwards at one end to form feet having openings to receive screws by which the body portion can be attached to the fixed part, for example to a gate post of which the gate carries a horizontal bar, or to a wall or pillar for anchoring a D ring at the end of a strap.

It will be apparent that a releasable fastening or coupling according to the invention, when in engagement, will withstand heavy tensile loads and, moreover, cannot become unintentionally unshipped due either to compression or tension transmitted through the coupling since movement of the bar into the gate of the body portion is positively limited by the inner end of the slot-like gate itself, whereas outward movement of the rod or crosspiece is positively prevented by the catch which is held by the detent. Whilst engagement can be reliably effected by merely pushing the bar of the subsidiary portion into the gate of the body portion, release of the coupling can be readily, and substantially instantaneously, effected by a small movement of the detent whereupon the subsidiary portion of the fastening will be ejected from the body portion with considerable force thus ensuring that the two freed ends are widely separated and effectively cleared against risk of entanglement. In any case the gate is completely clear and free from any obstruction on which the bar might be liable to catch.

Though the spring-biassing is of importance in providing for ejection of the bar when the detent is tripped, the spring is not a vital component since, even should the spring fracture, the catch will be held by the detent until the latter is manually released.

A releasable fastening according to the invention is particularly suitable for use on safety belts for aircraft, military equipment, parachute harness, and quick-release attachments for aircraft freight nets, though, as will be apparent from the above, the invention is not limited for use in these spheres. Great strength is obtained from cheaply manufactured parts of small dimensions, i. e. plate metal stampings and rivets, the assembly being thin and flat and substantially free from surface projections liable to catch in other parts. The same design of components can be employed for either heavy or light duties, ranging from those demanded, for example, by cargo nets or slings to those represented by mere interconnections, as in jewellery snaps for bracelets, necklaces and the like.

It will be understood that the constructions described above are given by way of example only and that details may be modified to suit requirements.

What I claim as my invention and desire to secure by Letters Patent is:

1. A releasable fastening comprising a body portion for releasably retaining a subsidiary portion including a bar, the body portion comprising a pair of spaced parallel plates having at one end an open-ended notch to receive the bar, a forked retaining catch pivotally mounted between the plates of the body and movable between a released position in which one limb of the fork projects into the notch and a locked position to which it can be turned by the bar entering the notch and in which the other limb of the fork bridges the open end of the notch to prevent withdrawal of the bar, a locking detent pivotally mounted between the plates of the body and having a first latching surface which engages the catch to automatically lock the latter in its locked position when it is moved thereto and a second latching surface which engages the catch when in the released position to prevent movement of the catch beyond the released position, tripping means for the detent, spring means acting on the detent to bias it towards its position engaging the catch and spring means acting on the catch to bias it towards its released position.

2. A releasable fastening comprising a body portion for releasably retaining a subsidary portion including a bar, the body portion comprising a pair of spaced parallel plates having in one end an open-ended notch to receive the bar, a forked retaining catch pivotally mounted between the plates of the body and movable between a released position in which one limb of the fork projects into the notch and a locked position to which it can be turned by the bar entering the notch and in which the other limb of the fork bridges the open end of the notch to prevent withdrawal of the bar, a locking detent pivotally mounted between the plates of the body and having a first latching surface which engages an abutment surface of the catch to lock the latter in its locked position when it is moved thereto and a second latching surface which engages the abutment surface of the catch when in the released position to prevent movement of the catch beyond the released position, tripping means for the detent, and a single spring one end of which acts on the detent to bias it towards its position engaging the catch and the other end of which acts on the catch to bias it towards its released position.

3. A releasable fastening as claimed in claim 1 in which a portion of the catch extends outside the periphery of the plates and is adapted to be manually engaged for moving the catch to the locked position.

4. A releasable fastening as claimed in claim 1 including an anchorage pivoted to the end of the body portion remote from the notch and adapted to receive a strap.

5. A releasable fastening as claimed in claim 1 in which the periphery of the detent is wholly within the periphery of the plates, and in which the tripping means comprises a rotatable member secured to the detent and extending through one of the plates.

6. A releasable fastening as claimed in claim 5 in which the rotatable tripping member is flush with, or only projects slightly from the outside surface of the plate through which it extends, and is grooved or otherwise adapted for engagement by a tool for rotating it.

7. A releasable fastening comprising a body portion for releasably retaining a subsidiary portion including a bar, the body portion comprising a pair of spaced parallel plates and having in one end, referred to as the front end, an open-ended notch to receive the bar, a spring pivot extending between the plates adjacent the front end and one side of the body, a catch pivot extending between the plates to the rear of the spring pivot adjacent the other side of the body, a detent pivot extending between the plates to the rear of the spring and a catch pivot adjacent the same side of the body as the spring pivot, a forked retaining catch pivotally mounted between the plates on the catch pivot and rotatable between a released position in which one limb of the fork projects into the notch, and a locked position to which it can be turned by the bar entering the notch and in which the other limb of the fork bridges the open end of the notch to prevent withdrawal of the bar, a locking detent pivotally mounted between the plates on the detent pivot and having a first latching surface adapted to engage an abutment surface of the catch to lock the latter in its locked position when it is moved thereto and a second latching surface adapted to engage the same abutment surface of the catch when in the released position to prevent movement of the catch beyond the released position, and a single spring acting on the detent to bias it into engagement with the catch and acting on the catch to bias it towards its released position, in which the pivots for the spring, the detent and the catch constitute the means for holding the plates of the body together in spaced relationship.

References Cited in the file of this patent

UNITED STATES PATENTS

| | | |
|---|---|---|
| 591,396 | Fleming | Oct. 12, 1897 |
| 1,338,724 | Gledhill | May 4, 1920 |
| 1,900,227 | Craig | Mar. 7, 1933 |

FOREIGN PATENTS

| | | |
|---|---|---|
| 568,630 | Great Britain | Apr. 13, 1945 |
| 632,624 | Germany | July 10, 1936 |